United States Patent [19]

Rutter

[11] 4,281,482
[45] Aug. 4, 1981

[54] SPINDLE NOSE FOR MACHINE TOOLS

[75] Inventor: Harold T. Rutter, Kirkwood, Mo.

[73] Assignee: Sunnen Products Company, St. Louis, Mo.

[21] Appl. No.: 81,625

[22] Filed: Oct. 4, 1979

[51] Int. Cl.$^3$ .................. B23B 5/22; B23B 31/00; B24B 41/04
[52] U.S. Cl. .................... 51/168; 279/1 L; 279/18; 279/83; 408/714
[58] Field of Search .................. 51/168; 279/1 J, 1 L, 279/83, 5, 6, 16, 18; 409/231, 232, 234; 408/714, 127

[56] References Cited

U.S. PATENT DOCUMENTS

| | | | |
|---|---|---|---|
| 2,376,851 | 5/1945 | Sunnen | 51/338 |
| 2,833,544 | 5/1958 | Blades | 279/6 |
| 3,152,424 | 10/1964 | Sunnen | 51/165 R |
| 3,544,117 | 12/1970 | Bingham | 279/6 |

Primary Examiner—Roscoe V. Parker
Attorney, Agent, or Firm—Haverstock, Garrett & Roberts

[57] ABSTRACT

An apparatus adapted to be installed for rotation on a machine and having a portion for receiving and supporting a working assembly such as a honing mandrel and a mounting adapter therefor including a mounting member for attaching the apparatus to a machine a first member having a first portion at one end for attaching to the mounting member and a tubular portion at the opposite end having a first bore of predetermined diameter adjacent to the inner end thereof and a second bore portion of greater diameter extending to the opposite end thereof, a second member positioned extending into the bore in the first member from the opposite end thereof and having an internal bore therein, the second member being constructed to permit some bending thereof, a portion on the outside diameter of the second member being the same as the predetermined diameter of the first bore portion of the first member for engagement therewith, the rest of the second member being of less diameter than the second bore portion, first and second pairs of opposed radially extending threaded members mounted in the first member adjacent the opposite end thereof for engagement with the second member and adjustable to establish the angular orientation of the opposite end portion of the second member, and other pairs of opposed radially extending threaded members in the first member engageable with the mounting member and adjustable to relocate the mandrel axis to compensate for mandrel wear.

16 Claims, 11 Drawing Figures

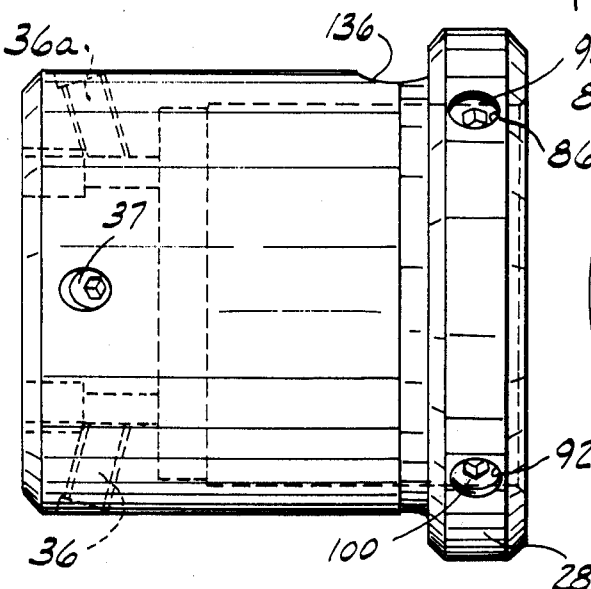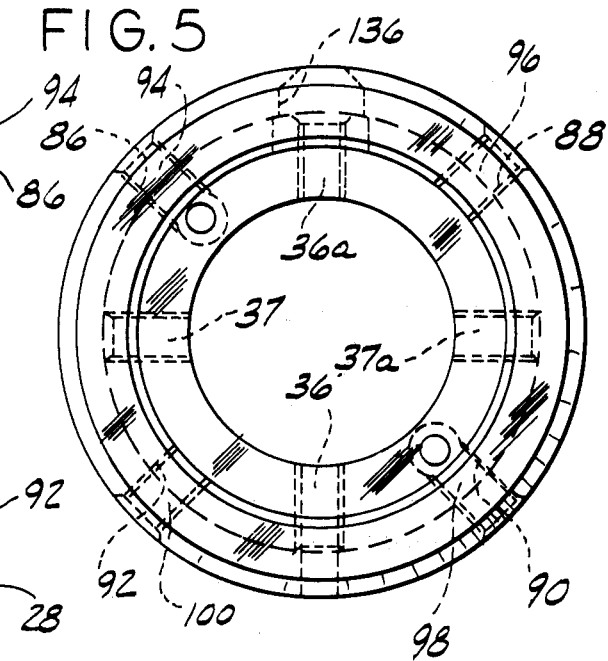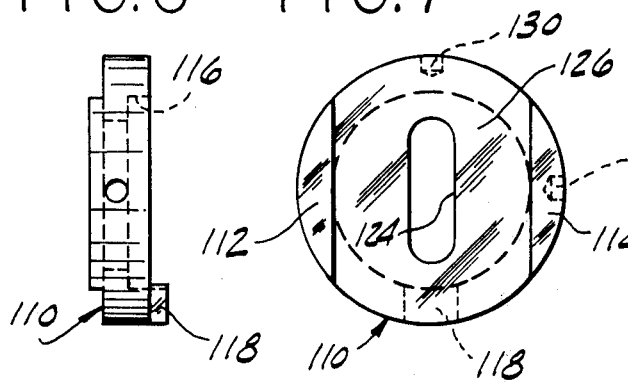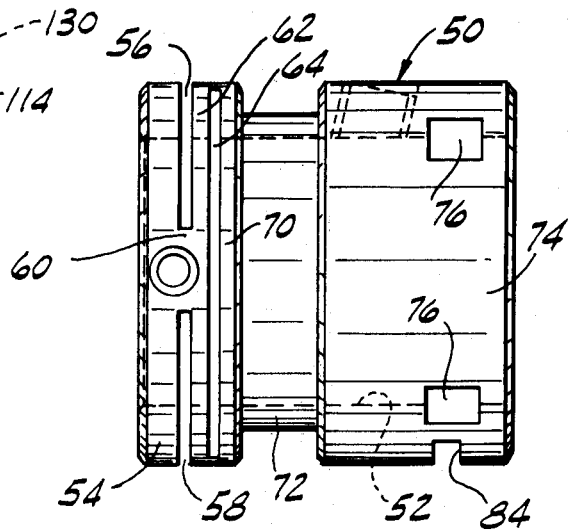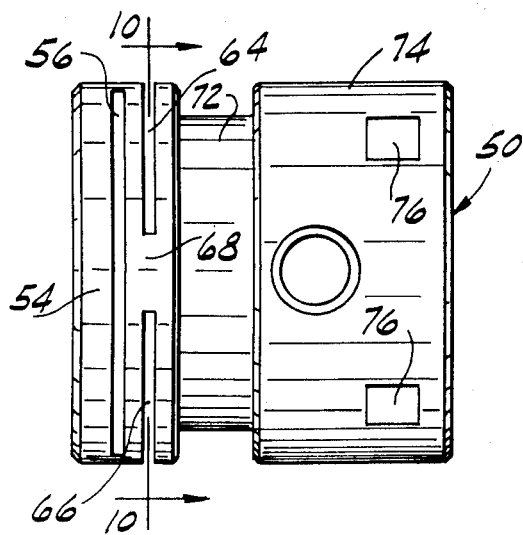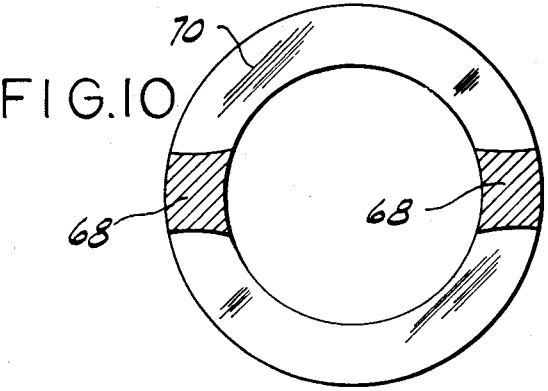

SPINDLE NOSE FOR MACHINE TOOLS

Machine tools that have rotatable work engaging members are widely used in industry and are well known. This is true of honing and other machines that employ rotatable members or mandrels with radially movable work engaging members that move outwardly during operation to maintain engagement with the work and to apply working pressure thereto. It can readily be understood that maintenance of the alignment accuracy of the axis of rotation of the mandrel is very important to the accuracy of the results achieved. Simply to rely on the accuracy of the parts which support the mandrel for rotation without making any provision for adjustment to correct for mandrel axis misalignment, however slight, limits the accuracy of the results that can be achieved and produces some error. It is also important to be able to shift the axis of the mandrel to compensate for wear of the mandrel parts and to provide the best possible operating condition. The present invention teaches the construction and operation of a novel adjustable spindle nose device which has provision for mandrel axis adjustment to establish accurate mandrel axis alignment during rotation and which also has provision to shift the mandrel laterally to compensate for wear. This application should be considered with copending Rutter application Ser. No. 81,624 entitled Fixture For Aligning And Locating The Axis of Rotation Of A Rotatable Member and filed contemporaneously herewith, which discloses an alignment device or fixture for use in conjunction with the subject spindle nose to make the adjustments thereof.

Typical prior art constructions which include rotatable mandrels, adapters and spindle noses are shown in Sunnen U.S. Pat. Nos. 3,152,424 and 2,376,851. No known devices, however, has means such as are included in the subject device, in the spindle nose itself, to adjust for alignment and compensate for wear.

The present spindle nose construction overcomes the limitations and shortcomings of the prior art devices by teaching an adjustable spindle nose construction which has means to adjust the axis of rotation of a rotating member mounted thereon so that even small off-axis movements are eliminated thereby making it possible to machine or hone surfaces of parts to greater accuracy and precision. The present means also enables periodic readjustment to compensate for parts wear and to enable each different mandrel installed therein to be individually aligned for rotational accuracy before being used. This represents an important advance in the accuracy and precision that can be achieved by honing and machining operations which employ rotatable work engaging members.

It is a principal object of the present invention to increase the accuracy of surfaces of parts that are machined or honed by rotating working members.

Another object is to provide improved and more accurate means to support a member for rotation.

Another object is to provide means adjustable to more accurately align and maintain the axis of rotation of a rotating member.

Another object is to provide means for supporting a rotatable member that is adjustable in more than one plane to establish accurate rotational alignment of the axis thereof.

Another object is to embody in the same spindle nose device means adjustable to establish alignment accuracy and means adjustable to laterally displace a rotatable member to compensate for wear of its parts.

These and other objects and advantages of the present invention will become apparent after consideration of the following detailed specification in conjunction with the accompanying drawings, wherein:

FIG. 4 is a side elevational view of the subject spindle nose;

FIG. 5 is a right end view of the device shown in FIG. 4;

FIG. 6 is a side elevational view of the drive plate employed in the present spindle nose;

FIG. 7 is a left side view of the drive plate of FIG. 6;

FIG. 8 is a side elevational view of the inner adjustable portion of the subject spindle nose;

FIG. 9 is a top view of the portion of the spindle nose portion shown in FIG. 8;

FIG. 10 is a cross-sectional view taken on line 10—10 of FIG. 9; and,

Figure 1:
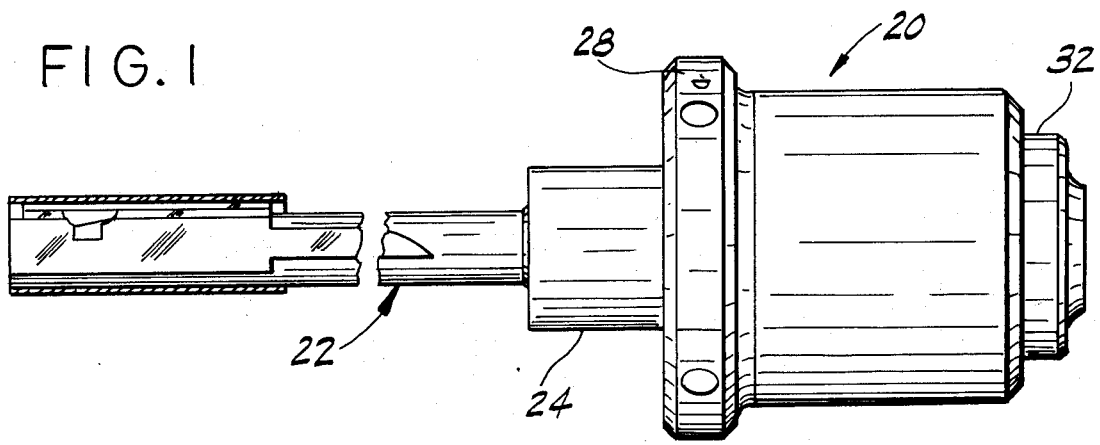
FIG. 1 is a side elevational view of the subject spindle nose shown supporting a honing mandrel and an adapter mounting therefor.

Referring to the drawings more particularly by reference numbers, number 20 refers to an adjustable spindle nose constructed according to the present invention. The spindle nose 20 is shown in FIG. 1 supporting a honing mandrel 22 which is mounted in an adapter 24. The adapter 24 is mounted in the spindle nose 20 with the mandrel 22 projecting therefrom to a free end. During operation the mandrel 22 and the spindle nose 20 with the adapter mounted therein are rotated on a machine such as on a honing machine. The spindle nose 20 may be used to support various mandrels and adapters. In the past, honing machines have included spindle noses, and when an adapter was mounted therein and tightened no way was provided to make further adjustment to correct for axis misalignment or to shift the mandrel laterally to compensate for wear of the work engaging parts. This has been a disadvantage because it is not possible to manufacture parts so accurately that every mandrel will always be mounted to rotate accurately about a fixed axis and wear of the work engaging parts can cause a mandrel to be unbalanced to some extent. Some error therefore results and the amount of error will increase depending on the extent of variation of deviation in the movement of the mandrel axis relative to a fixed axis. This can produce out-of-roundness of a surface being machined or honed and it can also cause one end of a bore or cylindrical surface to be honed more than the other. Usually the end of a bore that is furthest from the honing machine will be honed to be somewhat bell mouthed because of errors, however small, in the alignment of the axis of rotation. This is because the free end of the mandrel is the end that moves furthest from the true axis when there is some misalignment. The present spindle nose 20 includes adjustment means by which any out-of-axis alignment of the mandrel or mandrel wear can be very accurately corrected for.

Figure 3:
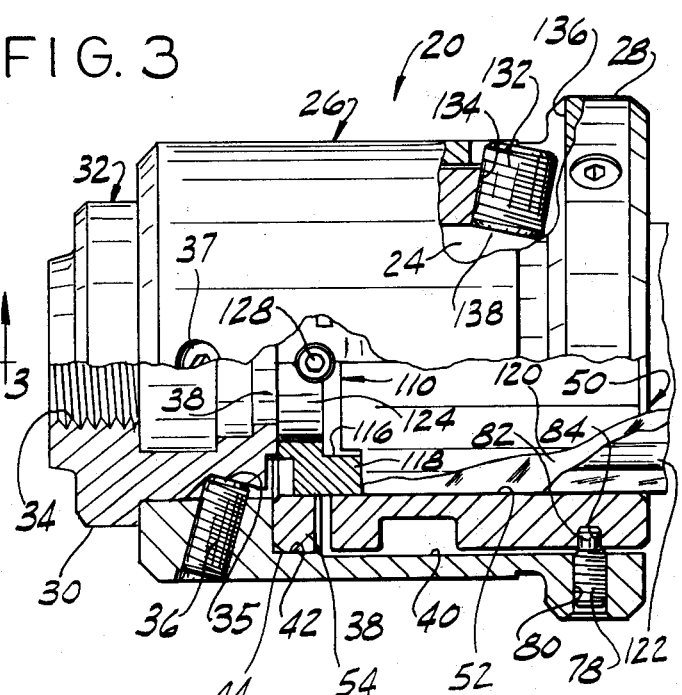
FIG. 3 is a side elevational view partly in cross-section and taken on line 3—3 of FIG. 2.
Figure 11:
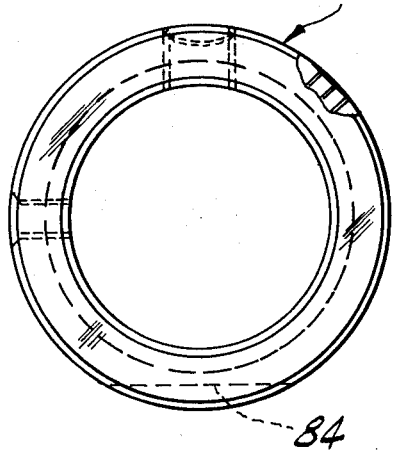
FIG. 11 is a right end view of the portion in FIG. 8.

FIG. 3 shows the main elements of the spindle nose 20 and their relationship when assembled. The main elements include an outer member 26 which is generally tubular in shape having an integral outwardly extending annular flange 28 at the forward end thereof which is the end into which an adapter such as the adapter 24 is positioned. The outer member 26 has a cylindrical inner surface 30 adjacent the end that is attached to the honing machine. This end of the member 26 receives a mounting member 32 which has an axially threaded bore 34 that is used for mounting the spindle nose on a honing machine. The mounting member 32 also has an inner surface 35 which is engaged by two pairs of opposed threaded members such as the pair of threaded members 36 and 36A and the pair 37 and 37A (FIGS. 3 and 5). The member 32 also has an annular endwardly extending ring portion 38, the purpose of which will be described later. The threaded locking members 36, 36A, 37 and 37A are radial but are oriented at an angle as shown to bear against the tapered surface 35 on the member 32 for safety reasons. The members 36, 36A, 37 and 37A are adjustable to locate the member 26 on the mounting member 32 to laterally position the mandrel 22 in the spindle nose 20 to compensate for wear of the mandrel parts. This adjustment is usually limited to being made through the plane of the stone assembly which is controlled by engagement between the endwardly extending ring portion 38 on the mounting member 32 and spaced portions 112 and 114 of a drive plate which will be described later.

The outer member 26 has a relatively large diameter cylindrical bore 40 which extends inwardly from the opposite end than the end where the member 32 is attached. The bore 40 communicates with a slightly smaller diameter intermediate bore portion 42 which extends to a shoulder 44, and the shoulder 44 extends therefrom inwardly to the still smaller diameter bore 30.

An adjustable member, also called nose member 50 is positioned extending through the bores 40 and 42 as shown in FIG. 3. The details of the nose 50 are shown in FIGS. 8-11. The nose 50 has a cylindrical bore 52 therethrough, and the outer surface thereof is defined by a first cylindrical portion 54 which extends into surface-to-surface engagement with the bore surface 42 in the member 26 when the members 26 and 50 are assembled as shown. The portion 54 extends to a pair of opposed radial grooves or notches such as the grooves 56 and 58 which extend into the member from opposite sides thereof to form a relatively narrow connection 60 between the portion 54 and an adjacent cylindrical portion 62. A second pair of radial grooves 64 and 66, similar to the grooves 56 and 58, are formed in the member 50 a short distance from the grooves 56 and 58 and form another relatively narrow connection 68 (FIG. 9). The connections 60 and 68 are at right angles to each other and are located on diameters of the member 50. The grooves 56, 58, 64 and 66 are provided to enable the portions of the nose member 50 on opposite sides thereof to be able to be angularly deflected relative to each other for adjustment purposes as will be described.

On the opposite side of the grooves 64 and 66 from the portion 62, is a relatively narrow cylindrical portion 70 which extends to and connects with a smaller diameter portion 72. The opposite side of the portion 72 is connected to a longer cylindrical portion 74, which in the construction shown in the same diameter as the portions 54, 62, and 70 and extends to the opposite end of the nose member 50. Four equally spaced flats 76 are formed in the surface of portion 74 to be engaged by threaded adjustment members. Except for the portion 54 that mates with the bore portion 42 in the member 26, the rest of the member 50 is smaller in diameter than the bore portion 40 through which it extends. This is important to the usefulness and operation of the subject device.

Figure 2:
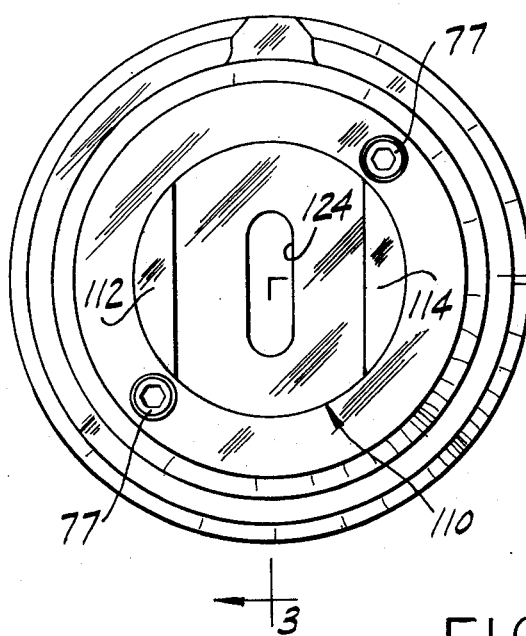
FIG. 2 is an enlarged right end view of the spindle nose per se as shown in FIG. 1.

When the member 50 is positioned inside the member 26 as shown in FIG. 3, the end portion 54 of the member 50 is maintained in position by means of the cooperation between the portion 54 and the bore portion 42 and also by means of axially extending bolts 77 which are positioned as shown in FIGS. 2 and 5. Another threaded member 78 extends through threaded bore 80 in the flanged portion 28 of the member 26 as shown in FIG. 3. The threaded member 78 has a cylindrical end portion 82 which cooperates with a relatively shallow groove 84 formed in the outer portion of the member 50. This does not prevent the members 26 and 50 from being able to move radially relative to each other for adjustment purposes but does limit axial movement of member 50 and is a safety feature to prevent the member 50 from coming out of the member 26 if it should break or become loose.

The flange 28 has four other spaced threaded bores 86, 88, 90, and 92 located as shown in FIGS. 4 and 5 which, respectively receive threaded members or set screws 94, 96, 98, and 100 that extend inwardly for engagement with respective flats 76 on the outer surface of the member 50. The set screws 94-100 are adjusted in opposed pairs to change the position of the adjacent end portion 74 of the member 50 relative to the end portion 54 which is fixed in the portion 42 in the member 26. Adjustment is made when an adapter such as the adapter 24 with the mandrel 22 mounted therein is locked in mounted position in the nose member 50.

The spindle nose 20 includes another member 110 (FIGS. 3, 6, and 7) which is positioned in the member 50 at the location shown. The member 110, called a drive plate, is a round member which has a pair of spaced opposed arcuate portions 112 and 114 that extend from the side thereof that is toward the mounting member 32. The annular ring 38 on the mounting member 32 is positioned extending between the portions 112 and 114, which portions limit the adjustment travel of the spindle nose in a sideways direction, the importance of which will be explained more fully hereinafter. The opposite side of the member 110 has a circular recess 116, and a sidewardly extending mounting lug 118 that extends from the member 110 into the chamber formed in the cylindrical bore 52. The lug 118 is constructed to extend between spaced side wall portions 120 and 122 of the adapter 24 on the open side thereof to orient the adapter 24 in the bore 52 and to provide a drive connection between the adapter 24 and the spindle nose 20. The drive plate 110 also has an elongated centrally located opening 124 through it which is needed to accommodate a drive connection between drive means on the honing machine and a wedge member in the mandrel. The wedge member is the member that is engaged with a stone feed up rod in the spindle and which engages and radially moves and applies honing pressure to the stone assembly. As indicated previously, the portions 112 and 114 of the drive plate 110 limit the adjustment travel of the spindle nose in a sideways direction, and the noted travel limitation serves to prevent the mandrel wedge from becoming disengaged from the stone feed up rod. The plate 110 is locked in fixed position in the member 50 by means of one or more threaded locking members 128 which are positioned in the member 50 and cooperate with bores 130 in the member 110.

The subject device 20 is assembled by installing and locking the member 110 in the member 50. The member 50 is then installed in the member 26 again orienting the members and locking them together using the threaded members 77. The mounting member 32 is also installed in the bore 30 and locked into position therein using the set screws 36, 36A, 37 and 37A to engage the surface 35 as aforesaid. With the device assembled as described and mounted on a honing machine, it is ready to receive an adapter member 24 which is slid into the bore 52 with the open side of the wall portions 120 and 122 thereof positioned extending on opposite sides of the drive lug 118 on the drive plate 110. The adapter 24 is then locked in position in the bore 52 by means of a threaded locking member 132 which is threadedly engaged with a bore 134 in the member 50. The locking member 132 is accessible for receiving a wrench such as an Allen wrench through a large bore or opening 136 in the member 26 (FIG. 3), and the member 132 is oriented at an angle to engage an angled surface 138 on the adapter 24 which surface is located on the opposite side thereof from the drive lug 118. In this position with the mandrel 22 fixedly mounted in the adapter 24 in the usual way, and with the mandrel wedge coupled to means on the honing machine through the opening 124 in the drive plate 110, it is possible to check and adjust the rotational alignment accuracy of the mandrel first using the adjustment screws 94–100 to correct any misalignment or wobble, and thereafter to locate the mandrel 22 in the best lateral position using the adjustment screws 36, 36A, 37 and 37A. These adjustments are most accurately made using an alignment fixture such as disclosed in copending Rutter application entitled Fixture For Aligning And Locating The Axis of Rotation Of A Rotatable Member and filed contemporaneously herewith. The set screws 94–100 and 36, 36A, 37 and 37A are adjusted in pairs, as by first adjusting one opposed pair such as the pair 94 and 98 and thereafter adjusting the other pair 96 and 100. The opposed pairs of set screws 94–100 provide means to establish the desired alignment accuracy of the mandrel. By properly adjusting the position of the portion 74 of the member 50 relative to the fixed portion 54, it is possible to establish very accurate alignment of the mandrel which is supported thereby in all positions of rotation thereof so that the mandrel will rotate about an aligned axis from end-to-end. This enables very accurate honing and eliminates even slight out-of-roundness and non-cylindrical conditions of a workpiece surface. By establishing the desired location of the mandrel axis it is also possible to compensate for stone and other mandrel wear and reduce or eliminate any tendency of the mandrel to be lopsided during operation.

Thus there has been shown and described an improved adjustable spindle nose construction for machine tools such as honing machines that have rotatable work engaging members or mandrels, which spindle nose fulfills all of the objects and advantages sought therefor. It will be apparent to those skilled in the art, however, that many changes, modifications, variations and other uses and applications of the subject device are possible. All such changes, modifications, variations and other uses and applications which do not depart from the spirit and scope of the invention are deemed to be covered by the invention which is limited only by the claims which follow.

What is claimed is:

1. Means to mount a rotatable member having an axis of rotation so that the axis of rotation of the rotatable member is fixed and aligned from end-to-end the rotatable member having a first portion for mounting it and a portion extending therefrom to a free end, said mounting means comprising a rotatable mounting assembly for receiving and supporting the rotatable member for rotation about a fixed and aligned axis, said mounting assembly including a first member having a cylindrical chamber defined by a cylindrical surface therein, a second member mounted in the cylindrical chamber and having a cylindrical outer surface, means including a portion of the cylindrical outer surface adjacent one end thereof engageable with one end of the cylindrical chamber surface locking said one end of said second member in the cylindrical chamber, said second member extending in said chamber from said locked end to a free opposite end adjacent to the opposite end of said chamber, means for mounting the first portion of the rotatable member in the second member, and means on the first member engageable with the second member adjacent to the free opposite end thereof, said means on the first member including means to change the position of said free opposite end thereof relative to the one end thereof, said means including at least two pairs of opposed members threadedly positioned in the first member and adjustable into engagement with the second member to predeterminately move the free opposite end of the second member relative to the locked end thereof.

2. The means defined in claim 1 wherein the first member has a second bore extending thereinto at the opposite end from the cylindrical chamber, a mounting member positioned extending into said second bore, said mounting member having an outer surface, and means including at least two pairs of members threadedly positioned in said first member for engaging the mounting member and adjustable to position the first member relative to said mounting member.

3. The means defined in claim 2 wherein the mounting member and the first member have cooperatively engageable means thereon which limit the amount of possible relative movement therebetween when positioning one in relation to the other.

4. An adjustable support structure for a rotatable member to support the member for rotation about a fixed axis of rotation along the length thereof comprising a first member having an axial bore formed therein including a first bore portion of predetermined diameter extending into the member from one end thereof and a second smaller diameter portion extending into the member from the first bore portion, a second member having an outer surface portion of approximately the same diameter as the diameter of the second bore portion, said second member being positioned in the axial bore in the first member, a portion of said second member extending through the first bore portion and being smaller in diameter than the first bore portion to form an annular space therebetween, and means including groove means formed in said second portion at an intermediate location therealong enabling portions of the second member on opposite sides thereof to be deflected angularly relative to each other, means to secure the second member in the axial bore in the first member, and threaded means on the first member adjustable into engagement with the portion of the second member that extends into the first bore portion, said threaded means being adjustable to predeterminately angularly deflect the portions of the second member on opposite sides of said groove means.

5. The support structure of claim 4 wherein the second member has means thereon to mount a rotatable member to be axially aligned and positioned for rotation.

6. The support structure of claim 4 wherein the groove means include axially spaced pairs of opposed grooves, the grooves of one of said pairs being angularly oriented relative to the other pair.

7. The support structure of claim 4 wherein the first and second members are both substantially tubular in shape.

8. The support structure of claim 4 including a drive member positioned in the second member, said drive member having an axially extending portion for drivingly engaging a member mounted therein to provide a driving and locating connection therebetween.

9. The support structure of claim 4 including means attached to the first member for mounting the member for rotation, said means including a second bore formed in the first member at the opposite end thereof from the axial bore, a mounting member having a portion extending into the second bore, and means including pairs of spaced members threadedly positioned in the first member and adjustable to position the mounting member in the second bore.

10. The support structure of claim 4 wherein the threaded means on the first member engageable with the second member include at least two pairs of opposed threaded members oriented at right angles to each other on the first member.

11. A support structure for a rotatable member including means to support said member for rotation about an axis comprising first and second tubular members nestable one within the other, said first member having spaced opposite ends and a cylindrical bore extending thereinto from one end, said bore having a first bore portion of predetermined diameter that extends adjacent to said one end and a second bore portion which extends from the opposite end of the first bore portion into the first member, the diameter of said second bore portion being smaller than the diameter of the first bore portion, said second member being positioned in the first member extending through the first and second bore portions, said second member having an outer diameter portion that is approximately the same size as the diameter of the second bore portion for engagement therewith and said second member forming an annular space with the first bore portion, means to secure said second member in the first member, said second member having a bore therethrough for receiving a rotatable member to be mounted therein and to extend therefrom, means in said second member for forming a drive connection between said second member and the member to be positioned therein, means formed in the second member at an intermediate location therealong weakening the second member to enable the portions thereof on opposite sides of the weakening means to be able to be angularly deflected relative to each other, and means in the first member adjacent to the free end thereof for engagement with the second member to adjust the position thereof and a member supported thereby by predeterminately deflecting the portions of the second member on opposite sides of the weakening means relative to each other.

12. The support structure defined in claim 11 wherein said means to predeterminately deflect the portions of the second member include pairs of opposed radially extending members threadedly positioned in the first member.

13. The support structure defined in claim 11 wherein the rotatable member is a honing mandrel having an adapter portion on one end thereof for mounting in the second member.

14. Means to support a rotatable work engaging member on a machine comprising a machine, a support structure for a work engaging member rotatably mounted on the machine, said support structure including first and second members with cylindrical portions one positioned extending through the other, said first member having a cylindrical bore formed therein for receiving the cylindrical portion of the second member, the cylindrical portion of the second member being smaller in diameter than the bore in the first member and having groove means formed thereon to enable opposite ends of the cylindrical portion to be angularly deflected relative to each other, means to fixedly anchor one end of the cylindrical portion of the second member to the first member adjacent one end of the bore therein, and means in the first member for engaging the opposite end of the cylindrical portion of the second member to predeterminately position the cylindrical portion therein, said cylindrical portion including means for mounting a work engaging member.

15. The support means of claim 14 including means to orient the support structure on the machine, said means including a rotatable support member on the machine including a member having an annular mounting surface thereon, a second bore in the first member for receiving said support member, and adjustable means on said first member for engaging the mounting surface on the support member including pairs of opposed members threadedly adjustable in the first member to establish a predetermined relationship between the mounting surface and the first member.

16. The support means of claim 15 including means to limit relative movement between the support member and the first member.

* * * * *